United States Patent [19]

Loch et al.

[11] Patent Number: 4,599,371

[45] Date of Patent: Jul. 8, 1986

[54] PREPARATION OF SELF-CROSSLINKING SYNTHETIC RESINS

[75] Inventors: Werner Loch, Erpolzheim; Eberhard Schupp, Schwetzingen; Rolf Osterloh, Gruenstadt; Arnold Dobbelstein, Junkersdorf; Klaas Ahlers, Muenster, all of Fed. Rep. of Germany

[73] Assignee: BASF Aktiengesellschaft, Fed. Rep. of Germany

[21] Appl. No.: 641,859

[22] Filed: Aug. 17, 1984

[30] Foreign Application Priority Data

Aug. 17, 1983 [DE] Fed. Rep. of Germany ....... 3329693

[51] Int. Cl.$^4$ ................................................. C08K 3/20
[52] U.S. Cl. ..................................... 523/402; 525/523; 204/56 R
[58] Field of Search ........................ 525/523; 523/402

[56] References Cited

U.S. PATENT DOCUMENTS

| 3,994,989 | 11/1976 | Kempter et al. | 260/831 |
| 4,119,599 | 10/1978 | Woo et al. | 525/523 |
| 4,507,446 | 3/1985 | Demmer | 525/523 |

FOREIGN PATENT DOCUMENTS 1457932 12/1976 United Kingdom .

OTHER PUBLICATIONS

Houben—Weyl "Methoden der Organischen Chemie", Band XI/1, S. 731, 1957.

*Primary Examiner*—Melvyn I. Marquis
*Attorney, Agent, or Firm*—Keil & Weinkauf

[57] ABSTRACT

Synthetic resins which are self-crosslinking under the action of heat have on average two phenolic hydroxyl groups per molecule and are prepared by reacting a reaction product of an epoxy resin and a bifunctional phenol with formaldehyde and a mixture of secondary amines.

After they have been protonated with an acid, the resins are suitable as cathodic electrocoating binders.

6 Claims, No Drawings

PREPARATION OF SELF-CROSSLINKING SYNTHETIC RESINS

The present invention relates to a process for the preparation of synthetic resins which are self-crosslinking under the action of heat, and cathodic electrocoating finishes produced using these resins.

German Published Application DAS No. 2,320,301 describes self-crosslinking synthetic resins and their use for the cathodic electrocoating of electrically conductive metal surfaces. They are prepared by reacting low molecular weight Mannich bases, obtained from polyhydric phenols, with polyepoxide compounds. In addition to normal secondary dialkylamines, the amine component used in the Mannich reaction is essentially a secondary hydroxylalkylamine, or a β-hydroxyalkylamine. The water-dispersibility of the resulting resins is due primarily to the hydrophilic β-hydroxyalkyl groups, since the basicity of the nitrogen of the Mannich bases is drastically reduced owing to the formation of intramolecular hydrogen bridges. Hence, it is impossible to dispense with the use of hydroxyalkylamines. However, the use of these amines gives rise to a number of problems. Their basicity is very low owing to the neighboring-group effect due to the β-hydroxyl group, so that the Mannich reaction does not proceed to completion. Relatively large amounts of β-hydroxyalkylamine remain unreacted, and are only neutralized by epoxide in the subsequent resin-synthesizing reaction. This results in dead chain ends, and equivalent amounts of low molecular weight phenolic Mannich bases remain unreacted. Because of the weak basicity of the β-hyroxyalkylamines, the Mannich groups obtained from them are sensitive to hydrolysis. The result is reduced bath stability.

German Published Application DAS No. 2,419,179 likewise describes self-crosslinking Mannich resins and their use as binders for cathodic electrocoating finishes. In addition to low molecular weight polyhydric phenols, prepolymers of these phenols and low molecular weight epoxy resins are also employed for the Mannich reaction. The synthesis of the synthetic resin which has the required molecular weight and is used as a surface coating binder once again entails subsequent chain-lengthening with epoxy resins. In this case, too, the presence of secondary β-hydroxyalkylamines in the Mannich reaction is absolutely essential for achieving water-dispersibility. The resulting finishes thus have the same disadvantages as those described in German Published Application DAS No. 2,320,301.

It is an object of the present invention to overcome these disadvantages, ie. to provide a process for the preparation of synthetic resins which are self-crosslinking under the action of heat and which can be processed to give cathodic electrocoating finishes possessing high bath stability and improved throwing power.

The present invention relates to a process for the preparation of synthetic resins which are self-crosslinking under the action of heat and based on polyadducts having a mean molecular weight $\overline{M}_n$ of from 750 to 5,000, contain on average two or more phenolic OH groups per molecule and can be diluted with water when an acid is added, wherein one or more aliphatic or aromatic epoxy resins possessing on average two or more epoxide groups per molecule and having an epoxide equivalent weight of from 87 to 2,000 are reacted with (a) from 55 to 125 mol%, based on the epoxide groups present in the epoxy resin, of a compound which, in addition to one or more phenolic OH groups, contains a further functional group whose reactivity toward epoxide groups is the same as, or greater than, that of a phenolic OH group, and which is of the formula (I)

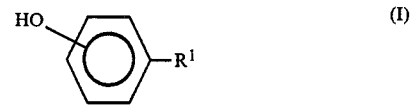

where the OH group is meta or para to $R^1$, and $R^1$ is a radical

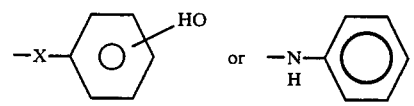

where the OH group is meta or para to X, and X is a straight-chain or branched divalent aliphatic radical of 1 to 3 carbon atoms or

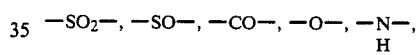

$$-(CH_2)_{n1}-\underset{H}{N}-(CH_2)_{n1}-, \quad -\underset{|}{CH}-(CH_2)_{n2}-Y,$$

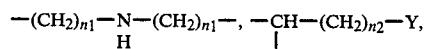

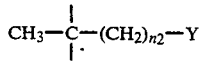

where $n_1$ is 1, 2 or 3, $n_2$ is 0, 1, 2 or 3 and Y is carboxyl, mercapto, a basic secondary amino group containing 1 to 4 carbon atoms, or an N-alkyl-substituted acid amide group where the alkyl chain is of 3 to 6 carbon atoms, is interrupted by a secondary basic amino group and is unsubstituted or substituted by an OH group, or is a cyclic amidine of the formula (II)

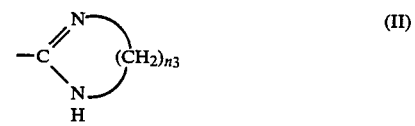

where $n_3$ is 2 or 3, until the epoxide value is <0.008, and the resulting polyadduct is reacted with, per mole of phenolic OH groups, (b$_1$) from 0.8 to 2.5 moles of formaldehyde or of a formaldehyde-donating compound and (b$_2$) from 0.7 to 2 moles of a mixture of b$_{2.1}$ from 0 to 99 mol% of a secondary amine of the formula (III)

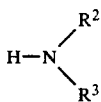 (III)

where $R^2$ and $R^3$ are identical or different and are each a cycloaliphatic radical of 5 or 6 carbon atoms or a straight-chain or branched aliphatic radical of 1 to 8 carbon atoms which may contain 1 or 2 alkoxy groups or 1 to 6 carbon atoms, or of a cyclic secondary amine of the formula (IV)

 (IV)

where $n_4 = 4$, 5 or 6 and 1 or 2 $CH_2$ groups can be replaced by an oxygen or sulfur atom, or of an alkylethanolamine or alkylisopropylamine, where alkyl is of 1 to 6 carbon atoms, or of a dialkanolamine where alkyl is of 2 or 3 carbon atoms, or of a mixture of such secondary amines with $b_{2.2}$ from 1 to 100 mol% of a secondary amine of the formula (V)

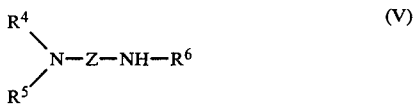 (V)

where $R^4$, $R^5$ and $R^6$ are identical or different and are each a cycloaliphatic radical of 5 or 6 carbon atoms or a straight-chain or branched aliphatic radical of 1 to 8 carbon atoms which may contain 1 or 2 hydroxyl groups or alkoxy groups of 1 to 6 carbon atoms, and Z is a straight-chain or branched divalent aliphatic radical of 2 to 12 carbon atoms, or of a secondary amine of the formula (VI)

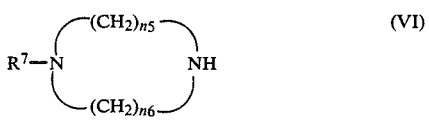 (VI)

where $n_5$ and $n_6$ are identical or different and are each 1, 2 or 3, and $R^7$ is an OH-substituted straight-chain or branched alkyl radical of 2 to 6 carbon atoms, and is thus converted to a polymeric Mannich base.

The present invention furthermore relates to a process for the cathodic electrocoating of electrically conductive substrates using the synthetic resins prepared by the novel process, and an aqueous cathodic electrocoating bath which contains the resin prepared according to the invention.

The resins are polymeric Mannich bases which give electrocoating baths having improved stability. Deposition from these baths onto electrically conductive substrates which are made the cathode gives films exhibiting improved throwing power.

Regarding the starting materials used in the novel process for the preparation of synthetic resins which are self-crosslinking under the action of heat, the following may be stated specifically:

Suitable aliphatic or aromatic epoxy resins which possess on average two or more epoxide groups per molecule and are reacted with component (a) are those which have an epoxide equivalent weight of from 87 to 2,000, preferably from 100 to 1,300, in particular from 180 to 700.

Examples of suitable epoxy resins are polyglycidyl ethers of polyphenols, eg. 2,2-bis-(4-hydroxyphenyl)-propane, 1,1-bis-(4-hydroxyphenyl)-ethane, bis-(4-hydroxyphenyl)-methane, bis-(2-hydroxynaphthyl)-methane, etc., which can be prepared by etherification of the stated polyphenols with epichlorohydrin in the presence of an alkali, polyglycidyl ethers of polyhydric alcohols, which can be obtained by the corresponding reaction of epichlorohydrin with polyhydric alcohols, such as ethylene glycol, diethylene glycol, triethylene glycol, propylene 1,2-glycol, propane-1,3-diol, pentane-1,5-diol, 2,2-bis-(4-hydroxycyclohexyl)-propane, glycerol, trimethylolpropane, pentaerythritol, etc., and N,N'-diglycidyl derivatives of N-heterocyclic compounds and triglycidyl isocyanurate, the polyglycidyl ethers of 2,2-bis-(4-hydroxyphenyl)-propane being preferred.

For reasons of flexibility, it may be advantageous if some or all of the stated epoxy resins are modified with less than the equivalent amounts of long-chain polyfunctional alcohols or mercaptans before the reaction with component (a).

While the reaction of the mercaptans with the epoxide groups takes place even in the absence of a catalyst, the reaction of the alcohols requires the use of a catalyst, eg. dimethylbenzylamine, and elevated temperatures (from 50° to 150° C.).

It is also possible to carry out partial or complete elastification by means of long-chain dicarboxylic acids, eg. azelaic acid, sebacic acid or dimeric fatty acids, or by means of long-chain di-sec.-amines, eg. the 2-(2-hydroxyethylamino)-ethylamides of the above dicarboxylic acids, which can also be employed in less than the equivalent amounts.

(a) Component (a), with which the stated epoxy resins are reacted by the novel process, is a compound which, in addition to one or more phenolic OH groups, contains a further functional group whose reactivity toward epoxide groups is the same as, or greater than, that of a phenolic OH group, and which is of the formula (I)

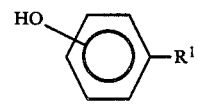

where the OH group is meta or para to $R^1$, and $R^1$ is a radical

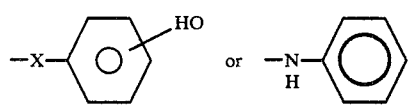

where the OH group is meta or para to X, and X is a straight-chain or branched divalent aliphatic radical of 1 to 3 carbon atoms or $$-SO_2-, -SO-, -CO-, -O-, -\underset{H}{N}-,$$

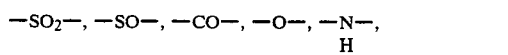

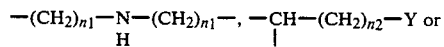

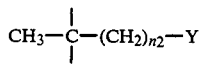

where $n_1$ is 1, 2 or 3, $n_2$ is 0, 1, 2 or 3 and Y is carboxyl, mercapto, a basic secondary amino group containing 1 to 4 carbon atoms, or an N-alkyl-substituted acid amide group where the alkyl chain is of 3 to 6 carbon atoms, is interrupted by a secondary basic amino group and is unsubstituted or substituted by an OH group, or is a cyclic amidine of the formula (II)

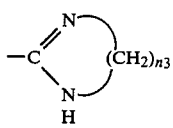

where $n_3$ is 2 or 3.

From 55 to 125, preferably from 65 to 100, mol%, based on the epoxide groups present in the epoxy resin, of component (a) is reacted with the stated epoxy resins, in general at from 60° to 160° C., preferably from 85° to 130° C., in the presence or absence of a catalyst, such as dimethylbenzylamine, dimethylethanolamine, thiodiglycol or the like, until the epoxide value has decreased to <0.008.

Examples of compounds which can be used as component (a) are bis-(4-hydroxyphenyl)-methane, 1,1-bis-(4-hydroxyphenyl)-ethane, 2,2-bis-(4-hydroxyphenyl)-propane, 4,4'-dihydroxydiphenyl sulfone, 4,4'-dihydroxydiphenyl sulfoxide, 4,4'-dihyroxybenzophenone, 4,4'-dihydroxydiphenyl ether, 4,4'-dihydroxydiphenylamine, p,p'-dihydroxydibenzylamine, 2,2-bis-(4-hydroxyphenyl)-acetic acid, 2,2-bis-(4-hydroxyphenyl)-ethyl mercaptan, 4,4-bis-(4-hydroxyphenyl)-valeric acid, N-ethyl-2,2-bis-(4-hydroxyphenyl)-ethylamine, the N-2-(2-hydroxyethylamino)-ethylamides of the above carboxylic acids, 2-[3,3-bis-(4-hydroxyphenyl)-n-butyl]-$\Delta^1$-imidazoline, 4-hydroxydiphenylamine and 3-hydroxydiphenylamine. Particularly preferred compounds are 2,2-bis-(4-hydroxyphenyl)-propane and 4,4-bis-(4-hydroxyphenyl)-valeric acid.

(b$_1$) Component (b$_1$), ie. formaldehyde of a formaldehyde-donating compound, is used in amounts of from 0.8 to 2.5, preferably from 1.6 to 2.2, moles per mole of phenolic OH groups of the polyadduct obtained by reacting the epoxy resin with the component (a), and can be employed in the form of an aqueous or alcoholic, eg. butanolic, formaldehyde solution or a formaldehyde-donating compound, eg. paraformaldehyde, can be used. Mixtures of these are also suitable.

(b$_2$) Component (b$_2$), which is employed together with component (b$_1$) in the novel process for the Mannich reaction, is preferably a mixture of two secondary amines of different types, b$_{2.1}$ and b$_{2.2}$. It is employed in amounts of from 0.7 to 2, preferably from 1.5 to 2, moles per mole of phenolic OH group of the polyadduct obtained by reacting the epoxy resin with component (a).

b$_{2.1}$ Component b$_{2.1}$, which is present in the amine mixture (b$_2$) in amounts of from 0 to 99, preferably from 25 to 75, in particular from 40 to 60, mol%, can be: a secondary amine of the formula (III)

where $R^2$ and $R^3$ are identical or different and are each a cycloaliphatic radical of 5 or 6 carbon atoms or a straight-chain or branched aliphatic radical of 1 to 8 carbon atoms which may contain 1 or 2 alkoxy groups of 1 to 6 carbon atoms. Examples are di-n-butylamine, di-n-hexylamine, di-n-propylamine, diisopropylamine, N-methylcyclohexylamine and di-2-alkoxyethylamines, such as di-2-methoxy-, di-2-ethoxy- or di-2-butoxyethylamine; a cyclic secondary amine of the formula (IV)

where $n_4$ is 4, 5 or 6, and 1 or 2 CH$_2$ groups can be replaced by an oxygen and/or sulfur atom. Examples are pyrrolidine, piperidine, oxazolidine, thiazolidine, morpholine and thiomorpholine; and an alkylethanolamine or alkylisopropanolamine, where alkyl is of 1 to 6 carbon atoms, or a dialkanolamine, where alkyl is of 2 or 3 carbon atoms, eg. N-methylethanolamine, N-ethylethanolamine, N-methylisopropanolamine, diethanolamine or diisopropanolamine.

It is also possible to use mixtures of the stated secondary amines b$_{2.1}$. Among the stated amines, the alkanolamines are less preferable; di-n-butylamine is particularly preferred.

b$_{2.2}$ Component b$_{2.2}$, which is present in the amine mixture (b$_2$) in amounts of from 1 to 100, preferably from 25 to 75, in particular from 40 to 60, mol%, can be a secondary amine of the formula (V)

$$\underset{R^5}{\overset{R^4}{\diagdown}}N-Z-NH-R^6 \qquad (V)$$

where $R^4$, $R^5$ and $R^6$ are identical or different and are each a cycloaliphatic radical of 5 or 6 carbon atoms or a straight-chain or branched aliphatic radical of 1 to 8 carbon atoms which may contain 1 or 2 hydroxyl groups or alkoxy groups of 1 to 6 carbon atoms, and Z is a straight-chain or branched divalent aliphatic radical of 2 to 12 carbon atoms.

Examples of suitable compounds $b_{2.2}$ of this type are N,N,N'-trimethylethylenediamine, N,N-dimethyl-N'-(2-methoxyethyl)-ethylenediamine, N,N,N'-trimethylpropylene-1,3-diamine, N,N-diethyl-N'-methylpropylene-1,3-diamine, N,N-dimethyl-N'-isobutylpropylene-1,3-diamine, N,N-diethyl-N'-isobutylpropylene-1,3-diamine, N,N-dimethyl-N'-cyclohexylpropylene-1,3-diamine, N,N-dimethyl-N'-(2-hydroxyethyl)-propylene-1,3-diamine, N,N-dimethyl-N'-(2-methoxyethyl)-propylene-1,3-diamine, N,N-dimethyl-N'-(2-methoxypropyl)-propylene-1,3-diamine, N,N-bis-(2-hydroxyethyl)-N'-isobutylpropylene-1,3-diamine, N,N,N'-trimethylhexamethylene-1,6-diamine and mixtures of these; a secondary amine of the formula (VI)

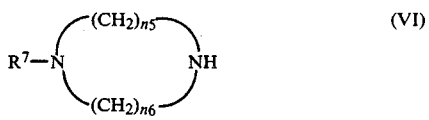

(VI)

where $n_5$ and $n_6$ are identical or different and are each 1, 2 or 3, and $R^7$ is an OH-substituted straight-chain or branched alkyl radical of 2 to 6 carbon atoms. An example of a suitable compound is N-hydroxyethylpiperazine.

Preferred compounds are N,N-dimethyl-N'-isobutylpropylene-1,3-diamine, N,N-dimethyl-N'-(2-methoxyethyl)-propylene-1,3-diamine and N-hydroxyethylpiperazine.

In addition to providing better water-dispersibility, the amines of the $b_{2.2}$ type increase the degree of conversion in the Mannich reaction. This results in more effective crosslinking, a lower residual content of amines in the electrocoating bath and, finally, improved throwing power.

The Mannich reaction is carried out under conventional conditions known from the literature, cf. for example Houben-Weyl, Methoden der organischen Chemie, Volume XI/1, page 731, 1957. The reaction temperatures are in general from 70° to 90° C., and the reaction times are from 3 to 5 hours. The polymer-analogous reaction is carried out in solvents conventionally used in surface coating technology; alcohols, such as isopropanol or isobutanol, glycol ethers, such as ethylene glycol monoethyl and monobutyl ether, and ketones, such as methyl ethyl ketone and methyl isobutyl ketone, are preferred.

The synthetic resins prepared by the novel process have mean molecular weights $\overline{M}_n$ of from 750 to 5,000 and can be diluted with water after partial or complete neutralization with an acid. They are therefore particularly useful as binders for cathodic electrocoating finishes.

The electrocoating finishes are prepared by a conventional method. The neutralizing agents used are organic or inorganic acids, such as formic acid, acetic acid, lactic acid or phosphoric acid, carboxylic acids being preferred. They are used in amounts such that the resulting pH of the bath is from 6.0 to 7.5, preferably from 6.5 to 7.0, so that corrosion of the plant is avoided. The electrocoating bath is brought in general to a solids content of from 5 to 30, preferably from 10 to 20, % by weight by dilution with demineralized water.

The electrocoating baths can furthermore contain other conventional additives, such as pigments, fillers, leveling agents, wetting agents, surfactants, curing catalysts and other, additional surface coating binders and/or crosslinking agents.

To improve the corrosion protection, it is advisable concomitantly to use heavy metal salts, eg. Cu(II) acetate, naphthenate or octoate, in amounts of from 0.1 to 1.0, preferably from 0.2 to 0.5, % by weight, based on the surface coating binder.

The surface coating binders prepared according to the invention can be used for the cathodic electrocoating of any electrically conductive substrates, eg. iron, aluminum, copper and the like, which, if required, can be pretreated chemically, eg. phosphatized.

The deposition voltages are from 50 to 400 V, preferably from 150 to 350 V, and deposition is carried out in general at from 15° to 40° C. for from 1 to 3 minutes. After the films deposited cathodically on the electrically conductive articles have been washed, they are cured at from 150° to 200° C. for from 10 to 30 minutes. The resulting coatings possess outstanding mechanical properties, such as great hardness and scratch-resistance, coupled with good flexibility and firm adhesion to the substrate.

The coatings obtained are furthermore distinguished by high resistance to solvents and resistance in the salt spraying test, and by good throwing power.

The Examples which follow illustrate the present invention without restricting it. Parts and percentages are by weight, unless stated otherwise.

EXAMPLE 1

(a) Preparation of an Elastified Epoxy Resin

A mixture of 705 parts of a commercial diglycidyl ether of 2,2-bis-(4-hydroxyphenyl)-propane having an epoxide equivalent weight of 188, 171 parts of 2,2-bis-(4-hydroxyphenyl)-propane, 309 parts of a commercial polycaprolactonediol having an OH equivalent weight of 275, and 75 parts of xylene is heated at about 120° C. 2 parts of water are separated off, after which 1.5 parts of dimethylbenzylamine are added at 140° C. The temperature increases to about 160° C., and this temperature is maintained for 1 hour. The mixture is cooled to 125° C., after which a further 2.25 parts of dimethylbenzylamine are added. The mixture is stirred for about 4 hours at 130° C., and a further 0.25 part of dimethylbenzylamine is added. After about 45 minutes, the epoxide equivalent weight has reached 900.

(b) Preparation of the Self-Crosslinking Surface Coating Binder 286 parts of 4,4-bis-(4-hydroxyphenyl)-valeric acid and thereafter 0.77 parts of dimethylbenzylamine are added, at 130° C., to 957 parts of the elastified epoxy resin described in Example 1a. The mixture is stirred for 45 minutes at 130° C., after which a further 1.5 parts of dimethylbenzylamine are added. After 1 hour, an epoxide value of 0.007 and an acid number of 7.4 mg of KOH/g are reached. The resin is diluted with 259 parts of a 1:1:1 mixture of ethylene glycol monoethyl ether, ethylene glycol monobutyl ether and ethylene glycol mono-n-hexyl ether and 246 parts of methyl isobutyl ketone.

Solids content: 68.3%

Höppler viscosity: 1,400 mPa.s (after further dilution to 50% with ethylene glycol monobutyl ether; measured at 20° C.)

A mixture of 347 parts of this resin solution, 19.5 parts of di-n-butylamine, 24 parts of N,N-dimethyl-N'-(2-methoxyethyl)-propylene-1,3-diamine and 9.9 parts of paraformaldehyde is stirred under nitrogen, first for 15 minutes at 50° C. and then for 1 hour at 80° C. The resulting self-crosslinking surface coating binder has a solids content of 75%.

(c) Preparation of a Cathodic Electrocoating Finish 1,000 parts of a 10% strength aqueous dispersion are prepared from 133 parts of the surface coating binder from Example 1b, 1.6 parts of acetic acid, 0.25 part of Cu(II) acetate and water. 66 parts of a pigment paste are added to the stirred dispersion, the pigment paste being prepared as described below.

Pigment paste:

First, a paste binder is prepared as follows: 485 parts of a commercial polyglycidyl ether of 2,2-bis-(4-hydroxyphenyl)-propane (epoxide equivalent weight 485) and 143 parts of 4,4-bis-(4-hydroxyphenyl)-valeric acid are dissolved in 269 parts of a 1:1 mixture of ethylene glycol monoethyl ether and ethylene glycol monobutyl ether, and the solution is heated to 100° C. 1.6 parts of thiodiglycol are added, after which the mixture is stirred for 2.5 hours at 100° C. A further 1.6 parts of thiodiglycol are then added, and the mixture is stirred for a further 2 hours at 100° C. The resulting product has an epoxide equivalent weight of 1,136 and an acid number of 0.

620 parts of this resin are reacted with a 92% strength solution of dimethyl-2-ethylhexylamine lactate in water at 85° C. for 2 hours. The epoxide value is then 0, and the solids content is 73.6%.

300 parts of this resin containing quaternary onium groups are reacted with 23 parts of N,N-dimethyl-N'-(2-methoxyethyl)-ethylenediamine and 4.4 parts of paraformaldehyde for 15 minutes at 50° C. and then for 1 hour at 80° C., in accordance with the invention, to give a polymeric Mannich base. The paste binder thus obtained has a solids content of 74%.

104 parts of paste binder, 3.4 parts of acetic acid, 4.5 parts of ethylene glycol monoethyl ether, 4.5 parts of ethylene glycol monobutyl ether, 4.5 parts of ethylene glycol mono-n-hexyl ether, 143 parts of rutile, 35 parts of kaolin, 8.5 parts of basic lead silicate, 2.3 parts of carbon black, 1.2 parts of iron oxide yellow, 51 parts of water and 400 parts of glass beads having a diameter of 2 mm are stirred in a stirred ball mill at a speed of 1,000 rpm. Separating off the glass beads and diluting with 137 parts of water gives a gray paste having a solids content of 53.6%.

The electrocoating finish has a pH of 6.5 It is stirred for 24 hours at 30° C. and is then deposited, at a deposition voltage of 150 V, onto zinc-phosphatized steel sheets which are made the cathode, deposition being carried out for 2 minutes in each case. The wet films are washed with water, blown dry and air and baked for 20 minutes at 180° C.

| Properties: | |
| --- | --- |
| Layer thickness: | 18 μm |
| Erichsen deep-drawing value: | 8.5 mm |
| Resistance to methyl isobutyl ketone (after rubbing 50 times with a cotton wool ball impregnated with methyl isobutyl ketone) | no attack |
| Salt spray test according to ASTM, for 480 hours (creepage at the scribe) | 0.5-1 mm |
| Throwing power according to Ford: | 15 cm |

EXAMPLE 2

(a) Preparation of the Self-Crosslinking Surface Coating Binder 228 parts of 2,2-bis-(4-hydroxyphenyl)-propane and thereafter 1.5 parts of dimethylbenzylamine are added, at 125° C., to 957 parts of the elastified epoxy resin described in Example 1a. After the mixture has been stirred for 1 hour at 130° C., the epoxide value has decreased to 0.005. The resin is diluted with 244 parts of a 1:1:1 mixture of ethylene glycol monoethyl ether, ethylene glycol monobutyl ether and ethylene glycol mono-n-hexyl ether and 235 parts of methyl isobutyl ketone.

Solids content: 67.6%

Höppler viscosity 2400 mPa.s (after further dilution to 50% with ethylene glycol monobutyl ether; measured at 20° C.)

A mixture of 679 parts of this resin solution, 52 parts of di-n-butylamine, 63 parts of N,N-dimethyl-N'-isobutylpropylene-1,3-diamine and 26 parts of paraformaldehyde is stirred under nitrogen, first for 15 minutes at 50° C. and then for 4 hours at 80° C. The resulting self-crosslinking surface coating binder has a solids content of 77%.

(b) Preparation of a Cathodic Electrocoating Finish 1,000 parts of a 10% strength aqueous dispersion are prepared from 130 parts of the surface coating binder from Example 2a, 6 parts of acetic acid, 0.25 part of Cu(II) acetate and water. 66 parts of a pigment paste are added to the stirred dispersion, the pigment paste being prepared as described below:

Pigment paste:

A paste binder is prepared as described in Example (1a) of German Laid-Open Application DOS No. 3,121,765. To do this, 200 parts of ethylene glycol monobutyl ether are heated to 90° C. in a reaction vessel. A mixture of 396 parts of N-vinylpyrrolidone, 204 parts of vinyl propionate and 1.2 parts of azobisisobutyronitrile is then added dropwise in the course of 2 hours. Polymerization is then continued for 1 hour at 90° C. The resulting solution polymer has a Fikentscher K value of 24. The solids content of the copolymer solution is 76%.

250 parts of the above copolymer solution, 210 parts of ethylene glycol monobutyl ether, 555 parts of ethylene glycol monoethyl ether, 837 parts of water, 1,084 parts of kaolin, 217 parts of basic lead silicate, 145 parts of carbon black, 36 parts of rutile and 3,000 parts of glass beads having a diameter of 2 mm are stirred for 45 minutes in a stirred ball mill at a speed of 1,000 rpm. After the glass beads have been separated off, a black paste having a solids content of 50.6% is obtained.

The electrocoating finish has a pH of 6.0. It is stirred for 24 hours at 30° C. and is then deposited, at a deposition voltage of 250 V, onto zinc-phosphatized steel sheets which are made the cathode, deposition being carried out for 2 minutes in each case. The wet films are washed with water, blown dry with air and baked for 20 minutes at 180° C.

| Properties | |
|---|---|
| Layer thickness: | 12 μm |
| Reverse impact: | 80 in × lb |
| Resistance to methyl isobutyl ketone (after rubbing 50 times with a cotton-wool ball impregnated with methyl isobutyl ketone) | no attack |
| Salt spray test according to ASTM, for 480 hours (creepage at the scribe) | 0.5 mm |
| Throwing power according to Ford: | 18.5 cm |

EXAMPLE 3

(a) Preparation of an Elastified Epoxy Resin

A mixture of 376 parts of a commercial diglycidyl ether of 2,2-bis-(4-hydroxyphenyl)-propane having an epoxide equivalent value of 188, 275 parts of a commercial polycaprolactonediol having an OH equivalent weight of 275 and 42 parts of xylene is heated to about 120° C. 1 part of water is separated off, after which 2 parts of dimethylbenzylamine are added at 125° C., and the mixture is stirred for 2 hour at 130° C. After the addition of a further 1 part of dimethylbenzylamine, the reaction is allowed to continue for a further 4 hours at 130° C. The epoxide equivalent weight is then 593.

(b) Preparation of the Self-Crosslinking Surface Coating Binder

The elastified epoxy resin described in Example 3a (695 parts) is directly processed further, in accordance with the invention, to give a surface coating binder. To do this, it is mixed, at 130° C., with 412 parts of a commercial diglycidyl ether of 2,2-bis-(4-hydroxyphenyl)-propane (epoxide equivalent weight 188) and 500 parts of 2,2-bis-(4-hydroxyphenyl)-propane, and the mixture is reacted for 135 minutes at 130° C. The epoxide value is then about 0.005. The resin is then diluted with 342 parts of a 1:1:1 mixture of ethylene glycol monoethyl ether, ethylene glycol monobutyl ether and ethylene glycol mono-n-hexyl ether and 326 parts of methyl isobutyl ketone.

Solids content: 69.7%

Höppler viscosity: 900 mPa.s (after further dilution to 50% with ethylene glycol monobutyl ether; measured at 20° C.)

A mixture of 409 parts of this resin solution, 26 parts of di-n-butylamine, 32 parts of N,N-dimethyl-N'-isobutylpropylene-1,3-diamine and 13 parts of para-formaldehyde is stirred under nitrogen, first for 15 minutes at 50° C. and then for 4 hours at 80° C. The resulting self-crosslinking surface coating binder has a solids content of 73%.

(c) Preparation of a Cathodic Electrocoating Finish 1,000 parts of a 10% strength aqueous dispersion are prepared from 137 parts of the surface coating binder from Example 3b, 3.2 parts of acetic acid, 0.25 part of Cu(II) acetate and water. 66 parts of a pigment paste are added to the stirred dispersion, the pigment paste being prepared as described below.

Pigment paste:

First, a paste binder is prepared as follows: 1,668 parts of a commercial polyglycidyl ether of 2,2-bis-(4-hydroxyphenyl)-propane (epoxide equivalent weight 1,670) are dissolved in 1,112 parts of ethylene glycol monobutyl ether. A mixture of 80 parts of dimethylethanolamine and 112.5 parts of an 80% strength aqueous lactic acid solution is then added. After the mixture has been stirred for 4 hours at 85° C., the epoxide value is 0. The resin is then diluted to a solids content of 55% with ethylene glycol monobutyl ether.

417 parts of this paste binder, 428 parts of rutile, 105 parts of kaolin, 25 parts of basic lead silicate, 7 parts of carbon black, 3.5 parts of iron oxide yellow, 508 parts of water and 4,500 parts of glass beads having a diameter of 2 mm are stirred for 45 minutes in a stirred ball mill at a speed of 1,000 rpm. After the glass beads have been separated off, a gray paste having a solids content of 53% is obtained.

The resulting electrocoating finish has a pH of 6.6 and has good bath stability at 30° C. over a period of several weeks. After aging for 7 days at 30° C., the finish is deposited, at a deposition voltage of 350 V, onto zinc-phosphatized steel sheets which are made the cathode, deposition being carried out for 2 minutes in each case. The wet films are washed with water, blown dry with air and baked for 20 minutes at 180° C.

| Properties: | |
|---|---|
| Layer thickness: | 15 μm |
| Reverse impact: | 120 in × lb |
| Resistance to methyl isobutyl ketone (after rubbing 50 times with a cotton-wool ball impregnated with methyl isobutyl ketone) | no attack |
| Salt spray test according to ASTM, for 480 hours (creepage at the scribe) | 0.3 mm |
| Throwing power according to Ford: | 23 cm |
| Corrosion Line: (after exposure to salt spray fog for 240 hours) | 21 cm |

We claim:

1. A process for the preparation of a synthetic resin which is self-crosslinking under the action of heat and based on polyadducts having a mean molecular weight $\overline{M}_n$ of from 750 to 5,000, contains on average two or more phenolic OH groups per molecule and can be diluted with water when an acid is added, wherein one or more aliphatic or aromatic epoxy resins possessing on average two or more epoxide groups per molecule and having an epoxide equivalent weight of from 87 to 2,000 are reacted with (a) from 55 to 125 mol%, based on the epoxide groups present in the epoxy resin, of a compound which, in addition to one or more phenolic OH groups, contains a further functional group whose reactivity toward epoxide groups is the same as, or greater than, that of a phenolic OH group, and which is of the formula (I)

where the OH group is meta or para to $R^1$, and $R^1$ is a radical

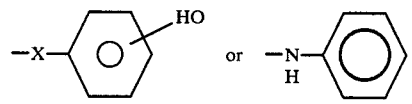

where the OH group is meta or para to X, and X is a straight-chain or branched divalent aliphatic radical of 1 to 3 carbon atoms or

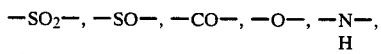

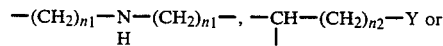

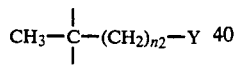

where $n_1$ is 1, 2 or 3, $n_2$ is 0, 1, 2 or 3 and Y is carboxyl, mercapto, a basic secondary amino group containing 1 to 4 carbon atoms, or an N-alkyl-substituted acid amide group where the alkyl chain is of 3 to 6 carbon atoms, is interrupted by a secondary basic amino group and is unsubstituted or substituted by an OH group, or Y is a cyclic amidine of the formula (II)

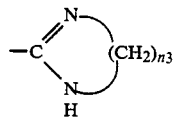

where $n_3$ is 2 or 3, until the epoxide value is <0.008, and the resulting polyadduct is reacted with, per mole of phenolic OH groups, (b₁) from 0.8 to 2.5 moles of formaldehyde or of a formaldehyde-donating compound and (b₂) from 0.7 to 2 moles of a mixture of $b_{2.1}$ from 0 to 99 mol% of a secondary amine of the formula (III)

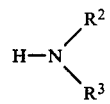

where $R^2$ and $R^3$ are identical or different and are each a cycloaliphatic radical of 5 or 6 carbon atoms or a straight-chain or branched aliphatic radical of 1 to 8 carbon atoms which cycloaliphatic, straight-chain or branched aliphatic radical may contain 1 or 2 alkoxy groups of 1 to 6 carbon atoms, or of a cyclic secondary amine of the formula (IV)

where $n_4=4$, 5 or 6 and 1 or 2 $CH_2$ groups can be replaced by an oxygen or sulfur atom, or of an alkylethanolamine or alkylisopropanolamine, where alkyl is of 1 to 6 carbon atoms, or of a dialkanolamine where alkyl is of 2 or 3 carbon atoms, or of a mixture of such secondary amines with $b_{2.2}$ from 1 to 100 mol% of a secondary amine of the formula (V)

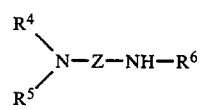

where $R^4$, $R^5$ and $R^6$ are identical or different and are each a cycloaliphatic radical of 5 or 6 carbon atoms or a straight-chain or branched aliphatic radical of 1 to 8 carbon atoms which may contain 1 or 2 hydroxyl groups or alkoxy groups of 1 to 6 carbon atoms, and Z is a straight-chain or branched divalent aliphatic radical of 2 to 12 carbon atoms, or of a secondary amine of the formula (VI)

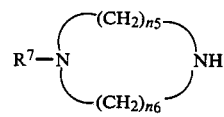

where $n_5$ and $n_6$ are identical or different and are each 1, 2 or 3, and $R^7$ is an OH-substituted straight-chain or branched alkyl radical of 2 to 6 carbon atoms, and is thus converted to a polymeric Mannich base.

2. The process of claim 1, wherein 100 mol%, based on the epoxide groups present, of 4,4-bis-(4-hydroxyphenyl)-valeric acid is used as component (a).

3. The process of claim 1, wherein 2,2-bis-(4-hydroxyphenyl)-propane is used as component (a).

4. The process of claim 1, wherein di-n-butylamine is used as component $b_{2.1}$.

5. The process of claim 1, wherein N,N-dimethyl-N'-isobutylpropylene-1,3-diamine is used as component $b_{2.2}$.

6. An aqueous surface coating bath for cathodic electrocoating, which contains from 5 to 30% by weight of the synthetic resin which is prepared by a process of claim 1 and which has been rendered water-dilutable by partial or complete neutralization with an acid.

* * * * *